US011433617B2

(12) United States Patent
Dubelman et al.

(10) Patent No.: US 11,433,617 B2
(45) Date of Patent: Sep. 6, 2022

(54) METHOD AND APPARATUS FOR PROCESS MONITORING IN ADDITIVE MANUFACTURING UTILIZING AN IMAGE OF A NEGATIVE STRUCTURE

(71) Applicant: General Electric Company, Schenectady, NY (US)

(72) Inventors: Meredith Elissa Dubelman, Liberty Township, OH (US); Mary Kathryn Thompson, Hamilton, OH (US); Christopher Barnhill, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 16/261,201

(22) Filed: Jan. 29, 2019

(65) Prior Publication Data
US 2020/0238624 A1    Jul. 30, 2020

(51) Int. Cl.
| | |
|---|---|
| B33Y 50/02 | (2015.01) |
| B29C 64/393 | (2017.01) |
| B33Y 10/00 | (2015.01) |
| B33Y 30/00 | (2015.01) |
| B29C 64/124 | (2017.01) |
| B29C 64/20 | (2017.01) |

(52) U.S. Cl.
CPC .......... *B29C 64/393* (2017.08); *B29C 64/124* (2017.08); *B29C 64/20* (2017.08); *B33Y 10/00* (2014.12); *B33Y 30/00* (2014.12); *B33Y 50/02* (2014.12)

(58) Field of Classification Search
CPC ...................................................... B33Y 50/02

USPC ........................................................ 700/118
See application file for complete search history.

(56) References Cited

U.S. PATENT DOCUMENTS

| | | | |
|---|---|---|---|
| 5,058,988 | A | 10/1991 | Spence et al. |
| 5,059,021 | A | 10/1991 | Spence et al. |
| 5,123,734 | A | 6/1992 | Spence et al. |
| 5,133,987 | A | 7/1992 | Spence et al. |
| 8,568,646 | B2 | 10/2013 | Wang et al. |

(Continued)

FOREIGN PATENT DOCUMENTS

| | | |
|---|---|---|
| CN | 108790150 | 11/2018 |
| JP | 2004257929 | 9/2004 |

OTHER PUBLICATIONS

International Search Report and Written Opinion issued in connection with related International Patent Application No. PCT/US2020/015173 dated May 14, 2020.

(Continued)

*Primary Examiner* — Suresh Suryawanshi
(74) *Attorney, Agent, or Firm* — Dinsmore & Shohl LLP

(57) ABSTRACT

A method is provided for controlling an additive manufacturing process in which a layer of resin is deposited on a build surface and selectively cured via selective application of radiant energy so as to define the geometry of a cross-sectional layer of the component, such that uncured resin remaining on the build surface after curing defines a negative structure of the layer being cured. The method includes: using an imaging apparatus to produce an image of the negative structure; evaluating the image of the negative structure and controlling at least one aspect of the additive manufacturing process with reference to the image of the negative structure.

35 Claims, 5 Drawing Sheets

(56) References Cited

U.S. PATENT DOCUMENTS

| | | | |
|---|---|---|---|
| 8,623,264 B2 | 1/2014 | Rohner et al. | |
| 8,666,142 B2 | 3/2014 | Shkolnik et al. | |
| 8,741,203 B2 | 6/2014 | Liska et al. | |
| 8,845,316 B2 | 9/2014 | Schillen et al. | |
| 9,064,922 B2 | 6/2015 | Nakajima et al. | |
| 9,067,359 B2 | 6/2015 | Rohner et al. | |
| 9,067,361 B2 | 6/2015 | El-Siblani | |
| 9,150,032 B2 | 10/2015 | Roof et al. | |
| 9,308,690 B2 | 4/2016 | Boyer et al. | |
| 9,415,547 B2 | 8/2016 | Chen et al. | |
| 9,457,374 B2 | 10/2016 | Hibbs et al. | |
| 9,529,371 B2 | 12/2016 | Nakamura | |
| 9,545,784 B2 | 1/2017 | Nakamura | |
| 9,632,037 B2 | 4/2017 | Chen et al. | |
| 2014/0239554 A1 | 8/2014 | El-Siblani | |
| 2015/0056365 A1 | 2/2015 | Miyoshi | |
| 2015/0104563 A1 | 4/2015 | Lowe et al. | |
| 2015/0246487 A1 | 9/2015 | El-Siblani | |
| 2015/0266242 A1 | 9/2015 | Comb et al. | |
| 2015/0301517 A1 | 10/2015 | Chen et al. | |
| 2015/0306825 A1 | 10/2015 | Chen et al. | |
| 2015/0321421 A1 | 11/2015 | Ding | |
| 2016/0332386 A1 | 11/2016 | Kuijpers | |
| 2017/0299973 A1 | 10/2017 | Frauens | |
| 2019/0126535 A1* | 5/2019 | Thompson | B29C 64/188 |
| 2019/0263062 A1* | 8/2019 | Pieger | B29C 64/245 |
| 2020/0055251 A1* | 2/2020 | Medalsy | B33Y 30/00 |

OTHER PUBLICATIONS

Hafkamp et al., Mechatronics, 2018, https://doi.org/10.1016/j.mechatronics.2018.02.006, The Netherlands.

* cited by examiner

METHOD AND APPARATUS FOR PROCESS MONITORING IN ADDITIVE MANUFACTURING UTILIZING AN IMAGE OF A NEGATIVE STRUCTURE

BACKGROUND OF THE INVENTION

This invention relates generally to additive manufacturing, and more particularly to methods of process monitoring in additive manufacturing.

Additive manufacturing is a process in which material is built up layer-by-layer to form a component. Stereolithography is a type of additive manufacturing process which employs a tank of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional resin.

It is desirable to monitor the additive build process for purposes such as: detecting machine and build failures, correcting the build if possible, or stopping the build if it cannot be corrected.

Methods are known in the prior art of using imaging apparatus to sense and evaluate the built layers.

One problem with existing build monitoring processes is that it is difficult to provide an easy line-of-sight to the component or the build zone. Also, because component might have excess uncured resin on it, it is difficult to know that what is measured is really the geometry that is cured. Furthermore, some types of components (e.g., loaded ceramic resins) are highly reflective and therefore hard to image optically.

BRIEF DESCRIPTION OF THE INVENTION

At least one of these problems is addressed by an additive manufacturing monitoring method in which an imaging apparatus is used to evaluate the negative image of a cured layer in remaining uncured resin.

According to one aspect of the technology described herein, a method is provided for controlling an additive manufacturing process in which a layer of resin is deposited on a build surface and cured via selective application of radiant energy so as to define the geometry of a cross-sectional layer of a component, such that uncured resin remaining on the build surface after curing defines a negative structure of the layer being cured. The method includes: using an imaging apparatus to produce an image of the negative structure; evaluating the image of the negative structure and controlling at least one aspect of the additive manufacturing process with reference to the image of the negative structure.

According to another aspect of the technology described herein, a method is provided for producing a component layer-by-layer, including: depositing resin which is radiant-energy-curable on a build surface located in a build zone of a resin support; positioning a stage relative to the build surface so as to define a layer increment in the resin on the build surface; selectively curing the resin on the build surface using an application of radiant energy in a specific pattern so as to define the geometry of a cross-sectional layer of the component; moving the build surface and the stage relatively apart so as to separate the component from the build surface, wherein uncured resin remaining on the build surface defines a negative structure of the layer being cured, the negative structure including at least one void; and using an imaging apparatus to produce an image of the negative structure.

According to another aspect of the technology described herein, an additive manufacturing apparatus includes: a resin handling assembly, the resin handling assembly including a resin support, wherein the resin support defines a build surface which is located in a build zone of the resin handling assembly; a material depositor operable to deposit a resin which is radiant-energy-curable onto the build surface; a stage positioned adjacent the build zone and configured to hold a stacked arrangement of one or more cured layers of a radiant-energy-curable resin; and one or more actuators operable to manipulate a relative position of the build surface and the stage; a radiant energy apparatus positioned adjacent to the build zone opposite to the stage, and operable to generate and project radiant energy in a predetermined pattern; and an imaging apparatus operable to produce an image of a negative structure which is defined by uncured resin remaining on the build surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
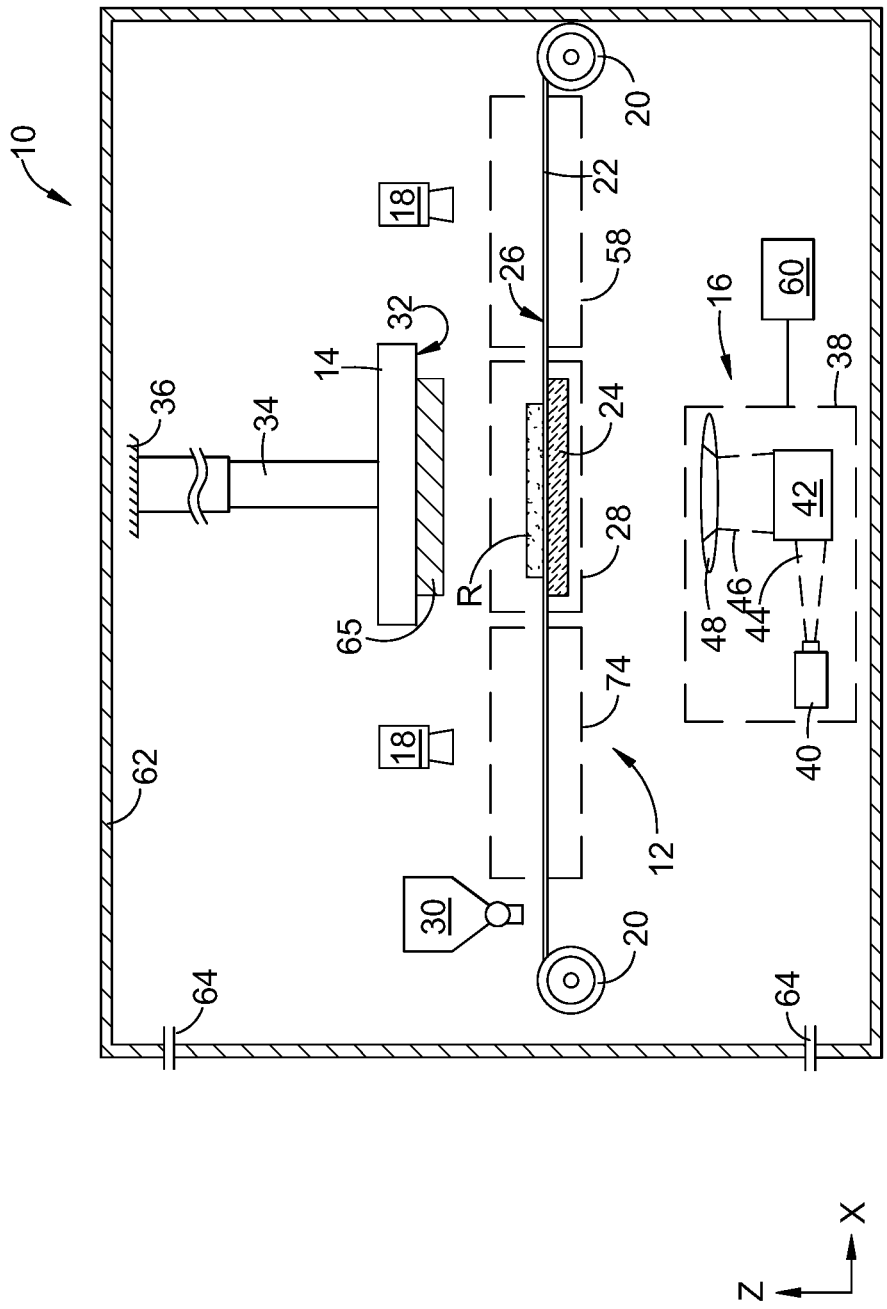
FIG. 1 is a schematic side view of an exemplary additive manufacturing apparatus.

Referring to the drawings wherein identical reference numerals denote the same elements throughout the various views, FIG. 1 illustrates schematically an example of one type of suitable apparatus 10 for carrying out an embodiment of an additive manufacturing monitoring method as described herein. It will be understood that other configurations of equipment may be used to carry out the method. Basic components of the exemplary apparatus 10 include a resin handling assembly 12, a stage 14, a radiant energy apparatus 16, and an imaging apparatus 18.

In the illustrated example, the resin handling assembly 12 is a "tape casting"-type device. The resin handling assembly 12 includes spaced-apart rollers 20 with a flexible polymeric tape or foil 22 extending therebetween. A portion of the foil 22 is supported from underneath by a support plate 24. Suitable mechanical supports (frames, brackets, etc.—not shown) would be provided for the rollers 20 and support plate 24. The foil 22 is an example of a "resin support".

Both of the support plate 24 and the foil 22 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 20 in such a manner so as to maintain the foil 22 tensioned between the rollers 20 and to wind the foil 22 from one of the rollers 20 to the other roller 20.

The foil 22 extending between the rollers 20 defines a "build surface" 26 which is shown as being planar, but could alternatively be arcuate (depending on the shape of the support plate). For purposes of convenient description, the build surface 26 may be considered to be oriented parallel to an X-Y plane of the apparatus 10, and a direction perpendicular to the X-Y plane is denoted as a Z-direction (X, Y, and Z being three mutually perpendicular directions).

The build surface 26 may be configured to be "non-stick", that is, resistant to adhesion of cured resin. The non-stick properties may be embodied by a combination of variables such as the chemistry of the foil 22, its surface finish, and/or applied coatings. In one example, a permanent or semi-permanent non-stick coating may be applied. One non-limiting example of a suitable coating is polytetrafluoroethylene ("PTFE"). In one example, all or a portion of the first build surface 26 may incorporate a controlled roughness or surface texture (e.g. protrusions, dimples, grooves, ridges, etc.) with nonstick properties. In one example, the foil 22 may be made in whole or in part from an oxygen-permeable material.

For reference purposes, an area or volume immediately surrounding the location of the foil 22 is defined as a "build zone", labeled 28.

Some means are provided for applying or depositing resin R to the build surface 26 in a generally uniform layer. FIG. 1 shows schematically a material depositor 30 which would be understood to include a reservoir for material communicating with the material outlet such as a slot or aperture (not shown). Conventional means such as a doctor blade (not shown) may be used to control the thickness of resin R applied to the foil 22, as the foil 22 passes under the material depositor 30.

The resin handling assembly 12 shown in FIG. 1 is merely an example. It will be understood that the monitoring method described herein be used with any type of resin support that will permit portions of a layer of resin to be retained thereon subsequent to a curing step. Nonlimiting examples of such resin supports include foils, tapes, plates, and single-layer vats.

The stage 14 is a structure defining a planar upper surface 32 which is capable of being oriented parallel to the build surface 26. Some means are provided for moving the stage 14 relative to the resin handling assembly 12 parallel to the Z-direction. In FIG. 1, the movement means are depicted schematically as a simple vertical actuator 34 connected between the stage 14 and a static support 36, with the understanding that devices such as ballscrew electric actuators, linear electric actuators, pneumatic cylinders, hydraulic cylinders, or delta drives may be used for this purpose. In addition to, or as an alternative to, making the stage 14 movable, the foil 22 could be movable parallel to the Z-direction.

The radiant energy apparatus 16 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 16 may comprise a "projector" 38, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micromirror device, a 2D array of LEDs, a 2D array of lasers, or optically addressed light valves. In the illustrated example, the projector 38 includes a radiant energy source 40 such as a UV lamp, an image forming apparatus 42 operable to receive a source beam 44 from the radiant energy source and generate a patterned image 46 to be projected onto the surface of the resin R, and optionally focusing optics 48, such as one or more lenses.

The radiant energy source 40 may comprise any device operable to generate a beam of suitable energy level and frequency characteristics to cure the resin R. In the illustrated example, the radiant energy source comprises a UV flash lamp.

The image forming apparatus 42 may include one or more mirrors, prisms, and/or lenses and is provided with suitable actuators, and arranged so that the source beam 44 from the radiant energy source 40 can be transformed into a pixelated image in an X-Y plane coincident with the surface of the resin R. In the illustrated example, the image forming apparatus 42 may be a digital micro-mirror device. For example, the projector 38 may be a commercially-available Digital Light Processing ("DLP") projector.

As an option, the projector 38 may incorporate additional means (not shown) such as actuators, mirrors, etc. configured to selectively move the image forming apparatus or other part of the projector 38, with the effect of rastering or shifting the location of the patterned image on the build surface 26. Stated another way, the patterned image may be moved away from a nominal or starting location. This permits a single image forming apparatus to cover a larger build area, for example. Means for mastering or shifting the patterned image from the image forming apparatus are commercially available. This type of image projection may be referred to herein as a "tiled image".

Figure 2:
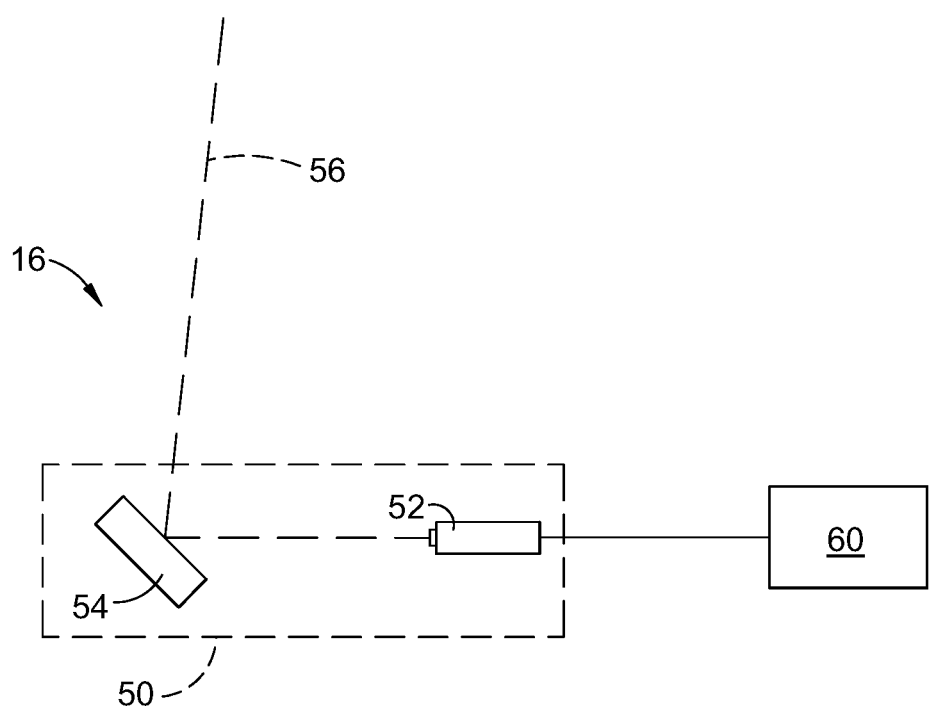
FIG. 2 is a schematic diagram of an alternative radiant energy apparatus for use with the additive manufacturing apparatus of FIG. 1.

In another exemplary embodiment as shown in FIG. 2, in addition to other types of radiant energy devices, the radiant energy apparatus 16 may comprise a "scanned beam apparatus" 50 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 50 comprises a radiant energy source 52 and a beam steering apparatus 54.

The radiant energy source 52 may comprise any device operable to generate a beam of suitable power and other operating characteristics to cure the resin R. Non-limiting examples of suitable radiant energy sources include lasers or electron beam guns.

The beam steering apparatus 54 may include one or more mirrors, prisms, and/or lenses and may be provided with suitable actuators, and arranged so that a beam 56 from the radiant energy source 52 can be focused to a desired spot size and steered to a desired position in plane coincident with the surface of the resin. The beam 56 may be referred to herein as a "build beam". Other types of scanned beam apparatus may be used. For example, scanned beam sources using multiple build beams are known, as are scanned beam sources in which the radiant energy source itself is movable by way of one or more actuators.

Referring back to FIG. 1, the imaging apparatus 18 is operable to produce a set of sensor data with appropriate selectivity and resolution to distinguish uncured resin from other structures (i.e. cured resin, debris, or the resin support), and to determine the boundaries of the uncured resin R with sufficient accuracy to permit evaluation and/or comparison to a reference image within a predetermined margin of error.

One example of a suitable configuration of sensor data is a digital image of the resin R comprising an array of individual image elements, i.e., pixels for a 2-D array or voxels for a 3-D array. Different imaging modalities may be used, e.g. optical or thermal.

The imaging apparatus 18 may use an active or passive imaging technique. The imaging apparatus 18 may be operable to produce, for each image element, a measurement of at least one physical characteristic. The measurement may include at least one scalar value such as brightness, intensity, or Z-height. Alternatively, the imaging apparatus 18 may produce a signal representative of multiple factors, for example RGB color values. The imaging apparatus 18 is also operable to produce relative or absolute positional information for each image element. For example, the output of the imaging apparatus 18 for a particular image element may be in the format X, Y, I where X equals X-position, Y equals Y-position, and I equals intensity.

This information permits discrimination of uncured resin R from debris, cured resin, or background elements such as the resin support, and also permits mapping of the boundaries of the uncured resin R.

Nonlimiting examples of suitable imaging apparatus 18 include photodiode arrays, photomultiplier tube ("PMT") arrays, digital cameras (e.g. CMOS or CCD), optical coherence tomography ("OCT") apparatus, white light interferometers, or confocal microscopes. The imaging apparatus 18 may include more than one device e.g., multiple cameras.

The imaging apparatus 18 is positioned so that its field-of-view encompasses the resin support. In the illustrated example, the imaging apparatus 18 is depicted as a digital camera positioned in an unloading zone 58 which is positioned outside of the build zone 28. The imaging apparatus 18 is oriented facing the foil 22.

Alternatively, means such as one or more actuators (not shown) could be provided for moving the imaging apparatus 18 into the build zone 28 when it is desired to image the resin R.

The apparatus 10 may include a controller 60. The controller 60 in FIG. 1 is a generalized representation of the hardware and software required to control the operation of the apparatus 10, including some or all of the resin handling assembly 12, the stage 14, the radiant energy apparatus 16, the imaging apparatus 18, and the various actuators described above. The controller 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control. For example, sensors could be used to monitor position, displacement, or movement of any of the components. Process sensors could be used to monitor output power or frequency characteristics of the radiant energy apparatus 16, or forces acting on the apparatus (e.g., stage 14 or foil 22). Imaging sensors (e.g. machine vision) could be used to observe the deposition or curing process. Information from any of the sensors could be used to monitor, control, or automate some or all of the operation of the apparatus 10, in conjunction with appropriate programming of the controller 60.

Optionally, the components of the apparatus 10 may be surrounded by a housing 62, which may be used to provide a shielding or inert gas atmosphere using gas ports 64. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

The resin R is preferably a relatively high viscosity fluid that will not "slump" or run off during the build process. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R, then loaded into the material depositor 30. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In one example, the filler composition may be selected for its electrical or electromagnetic properties, e.g. it may specifically be an electrical insulator, a dielectric material, or an electrical conductor. It may be magnetic.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIG. 1. It will be understood that, as a precursor to producing a component and using the apparatus 10, a component 65 is software modeled. e.g., in terms of a tool (energy source raster) path or as a stack of planar layers arrayed along the Z-axis. Depending on the type of curing method used, each layer may be divided into a grid of pixels. The actual component 65 may be modeled and/or manufactured as a stack of dozens or hundreds of layers. Suitable software modeling processes are known in the art.

Initially, the build zone 28 is prepared with resin R on the build surface 26. For example, the material depositor 30 may be used to deposit resin R over the build surface 26 of the foil 22.

Figure 3:
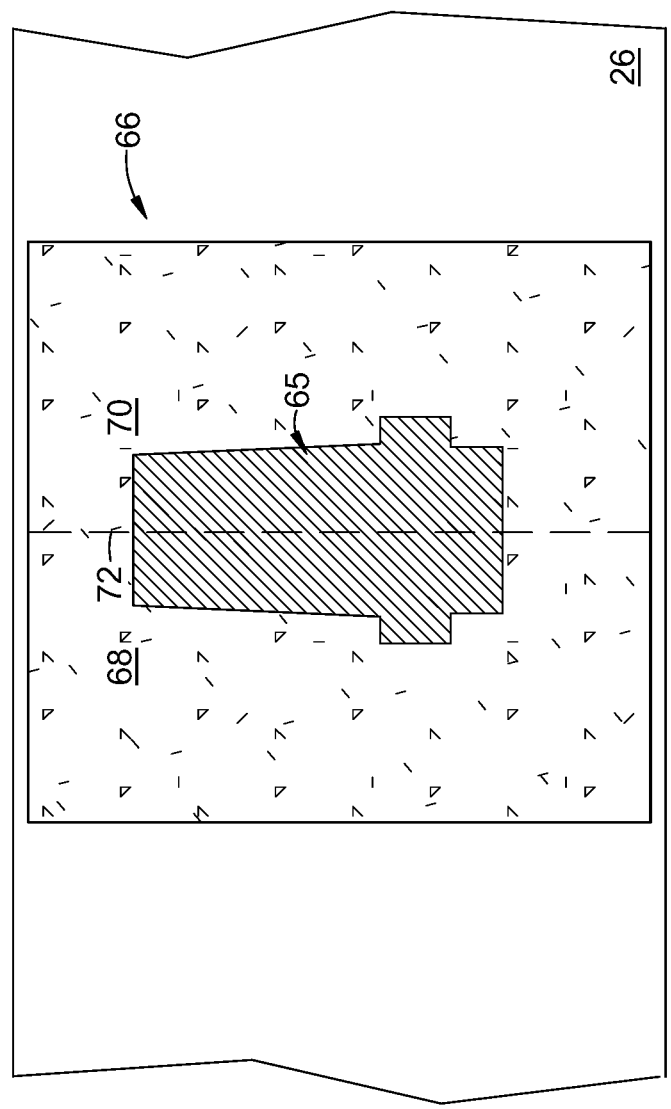
FIG. 3 is a schematic top plan view of a layer of resin disposed on a resin support.

Different materials may also be supplied to the build surface 26, at different times during the build. More than one material may also be supplied to different areas on a given build surface 26, at the same time. Optionally, any of the individual layers may comprise two or more material combinations. FIG. 3 illustrates an exemplary layer 66 showing a cross-section of the component 65 superimposed thereupon. The layer 66 is divided into a first section 68 including a first combination of resin R and filler, and a second section 70 including a second combination of resin R and filler. A dashed line 72 indicates the division between the two sections 68, 70. The shape, size, and number of sections, and number of different material combinations within a given layer may be arbitrarily selected. If multiple material combinations are used in one layer, then the deposition steps described above would be carried out for each section of the layer.

Figure 5:
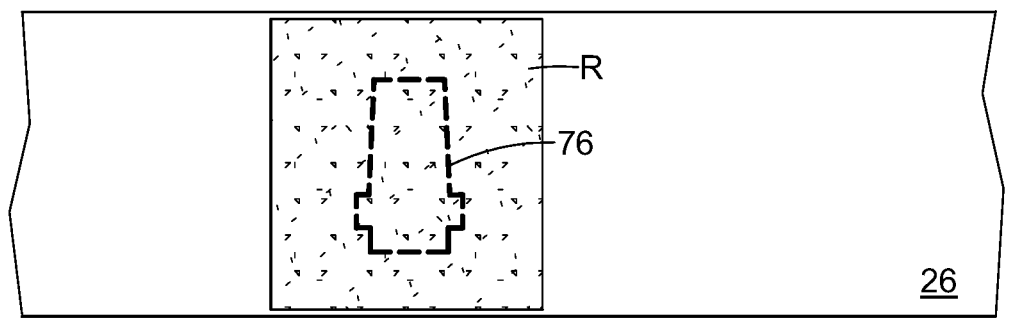
FIG. 5 is a schematic plan view of a resin support of the apparatus of FIG. 1, showing a layer of uncured resin deposited thereon, with an intended component layer superimposed on the resin.
Figure 4:
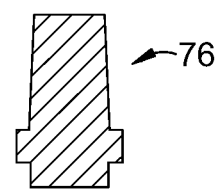
FIG. 4 is a schematic plan view of a layer of an additively-manufactured component.

Optionally, the imaging apparatus 18 may be used to image the deposited, uncured resin R on the build surface 26. For example, an image may be obtained and analyzed to determine if the build surface 26 is covered uniformly with resin R, if any debris is present in the resin R. Optionally, additional equipment may be provided specifically for evaluating deposition. For example, FIG. 1 shows an additional imaging apparatus 18 located in a "loading zone" 74 positioned near the material depositor 30 and outside the build zone 28 opposite to the unloading zone 58. FIG. 4 illustrates a representative intended layer 76 of a component 65, while FIG. 5 illustrates a layer of uniformly-deposited resin R on the build surface 26, with the perimeter of the intended layer 76 superimposed thereupon.

After the material is deposited, the apparatus 10 (or parts thereof) is configured or positioned to define a selected layer increment relative the build surface 26. The layer increment is defined by some combination of the thickness to which the resin R is applied and the operation of the stage 14. For example, the stage 14 could be positioned such that the upper surface 32 is just touching the applied resin R, or the stage 14 could be used to compress and displace the resin R to positively define the layer increment. The layer increment affects the speed of the additive manufacturing process and the resolution of the component 65. The layer increment can be variable, with a larger layer increment being used to speed the process in portions of a component 65 not requiring high accuracy, and a smaller layer increment being used where higher accuracy is required, at the expense of process speed.

Once the resin R has been applied and the layer increment defined, the radiant energy apparatus 16 is used to cure a two-dimensional cross-section or layer of the component 65 being built.

Where a projector 38 is used, the projector 38 projects a patterned image representative of the cross-section of the component 65 through the support plate 24 and foil 22 to the resin R. This process is referred to herein as "selective" curing. It will be understood that photopolymers undergo degrees of curing. In many cases, the radiant energy apparatus 16 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 16 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is complete, the stage 14 is separated from the build surface 26, for example by raising the stage 14 using the vertical actuator 34. It will be understood that the resin R and/or cured layer do not necessarily join, stick, or bond with the build surface 26. Accordingly, as used herein the term "separate" refers to the process of moving two elements apart from each other and does not necessarily imply the act of breaking a bond or detaching one element from another.

Figure 6:
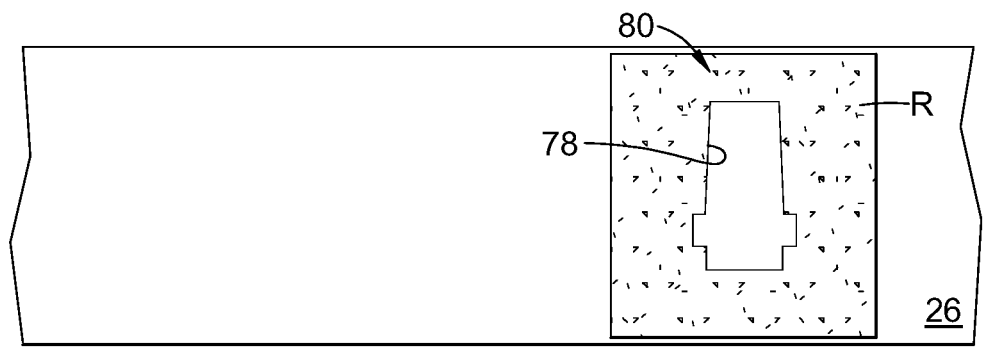
FIG. 6 is a schematic plan view of the resin layer shown in FIG. 5, showing an example of a negative image resulting from correctly-built component layer.

Subsequent to separation, the resin R remaining on the build surface 26 will include one or more voids 78 representing material that has been cured and bonded to the component 65. FIG. 6 illustrates remaining resin R on the build surface 26, where the foil 22 has been advanced to move the remaining resin R into the unloading zone 58 The remaining resin R in combination with the voids 78 represent an inverse or negative structure 80 of the previously-cured layer of the component 65.

Accordingly, the imaging apparatus 18 may be used to produce one or more images of the negative structure 80 in the remaining resin R. This negative structure 80 can be used for multiple monitoring and quality control functions.

For example, the boundaries of the voids 78 may be compared to the intended component boundaries in a corresponding layer of the component software model described above. The comparison process could be manual, by a human observing the negative structure 80, or could be automated using appropriate software. Deviation of the void boundaries from the intended component boundaries indicates an error in the build process. FIG. 6 shows an example in which the boundaries of the void 78 match the intended boundaries shown in FIGS. 4 and 5. The comparison process may include a predefined acceptable margin of error.

Figure 7:
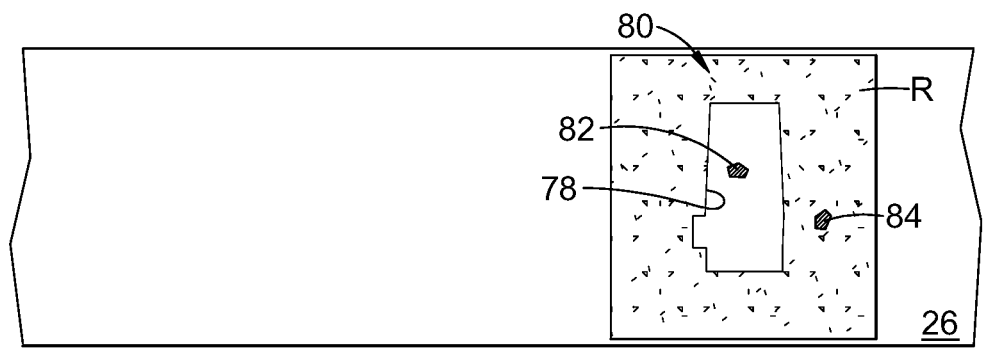
FIG. 7 is a schematic plan view of a resin layer shown in FIG. 5, showing an example of an incorrectly-built component layer.

As a counter-example, FIG. 7 shows an example in which the boundaries of the void 78 do not match the intended boundaries shown in FIGS. 4 and 5. This indicates a failure or error in some part of the apparatus or process.

In addition to defects in the intended layer boundaries, the resin R remaining on the build surface 26 may exhibit other defects such as debris (e.g., cured resin remnants 82) remaining in the voids 78 which did not completely bond to the component 65, or pieces 84 of unintentionally-cured resin R outside of the voids 78. Evaluation of the negative structure 80 may be useful in detecting such defects as well.

The negative pattern imaging and imaging apparatus described above may be useful in a more comprehensive additive manufacturing monitoring or control process. This is described in more detail below.

Subsequent to separation and optional imaging, the build surface 26 may be cleaned or otherwise rejuvenated and prepared for re-use. For example, advancing the foil 22 provides a clean surface within the build zone 28. As the foil 22 advances, the material depositor 30 would be used to apply resin R to the build surface 26 to ready it for curing again.

After separation, the component 65 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 65 and/or the stage 14 to ensure that no additional material or material contamination is present in the final component 65. For example, cleaning could be done by contacting the component 65 and/or the stage 14 with a cleaning fluid such as a liquid detergent or solvent.

This cycle of preparing the build surface 26, optionally imaging deposited resin R, incrementing a layer, selectively curing, separating the component 65 from the build surface 26, imaging the resin R and cleaning the component 65 and/or stage 14 would be repeated as necessary until the entire component 65 is complete.

Where a scanned beam apparatus is used for the build cycle described above, instead of a projector, the radiant energy source 52 emits a build beam 56 and the beam steering apparatus 54 is used to cure the resin R by steering a focal spot of the build beam 56 over the exposed resin R in an appropriate pattern.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned) results in a component 65 in which the filler (if used) is held in a solid shape by the cured resin R. This component may be usable as an end product for some conditions. Subsequent to the curing step, the component 65 may be removed from the stage 14.

If the end product is intended to be composed of the filler (e.g. purely ceramic, glass, metallic, diamond, silicon, graphite, etc.), the component 65 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

A monitoring process may be incorporated into the build process described above. Generally stated, the monitoring process includes using the imaging apparatus 18 described above to acquire images, evaluating the images and then adjusting one or more process parameters as necessary. As used herein, "process parameters" can refer to any controllable aspect of the apparatus 10.

The monitoring process may include establishing one or more predetermined limits for the comparison between the negative structure 80 and the reference or template, for example, a minimum percentage match with the template. The output of the comparison or evaluation may produce a result indicating an acceptable or unacceptable result.

The monitoring process may include performing automated software feature detection on the negative structure 80.

The monitoring process may include performing manual or automated metrology on the negative structure 80.

The monitoring process may include using a predetermined threshold of a process sensor output to trigger operation of the imaging apparatus 18. For example, the imaging apparatus 18 by only be configured to operate if a force sensor coupled to the stage 14 indicates compressive forces between stage 14 and foil 22 in excess of a predetermined threshold.

The monitoring process may include taking a discrete action in response to the comparison having an unacceptable result, such as providing a visual or audible alarm to a local or remote operator.

The monitoring process may include pausing or stopping the build process in response to the comparison having an acceptable result. This is another example of a discrete action.

The monitoring process may include stopping the build process for only one feature of the component 65, or for only one component (if multiple components are being built simultaneously). This is another example of a discrete action.

The monitoring process may include repeating the deposition and curing process (e.g. "reprinting") all or part of a layer.

The monitoring process may include real-time control of one or more process parameters, such as directed energy source power level, beam scan velocity, stage movement, resin support movement, or operation of the material depositor 30, using a method such as: statistical process control, feedforward control, feedback control using proportional, proportional-integral, or proportional-integral-derivative control logic, neural network control algorithms, or fuzzy logic control algorithms.

The monitoring method may include monitoring of the condition or "health" of the apparatus 10. Negative structure images may be evaluated and stored during several build cycles and compared between cycles. For example, a change in build consistency between cycles could indicate machine miscalibration or degradation. Corrective action could take the form of machine maintenance or repairs, or modification of process parameters in subsequent builds to compensate for machine degradation.

The method described herein has several advantages over the prior art. It permits the implementation of inline or online quality and process monitoring in additive manufacturing. It permits detection of machine and build failures and affords the possibility of correcting a build or stopping it, if it cannot be corrected. It will provide an early estimate of part quality so other decisions can be made (e.g. inspection, repair, scrapping. It also provides additional information that can be used to improve the machine, product, and process design.

The foregoing has described a method and apparatus for monitoring additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of controlling an additive manufacturing process in which a layer of resin is deposited on a build surface and cured via selective application of radiant energy so as to define the geometry of a cross-sectional layer of a component, such that uncured resin remaining on the build surface after curing defines a negative structure of the layer being cured, the method comprising:
    using an imaging apparatus to produce an image of the negative structure;
    evaluating the image of the negative structure; and
    controlling at least one aspect of the additive manufacturing process with reference to the evaluation of the image.

2. The method of claim 1 wherein the step of using the imaging apparatus includes shifting the build surface to move the remaining resin out of a build zone and into the field-of-view of the imaging apparatus, prior to producing the image.

3. The method of claim 1 wherein the step of evaluating the negative structure further includes identifying the presence of cured resin remnants within voids of the negative structure.

4. The method of claim 1 wherein the imaging apparatus is a digital camera.

5. The method of claim 1 wherein the evaluation of the image includes performing feature detection on the image.

6. The method of claim 1 wherein the evaluation of the image includes performing metrology on the image.

7. The method of claim 1 wherein the step of controlling includes taking a discrete action in response to the evaluation of the image indicating an unacceptable result.

8. The method of claim 1 wherein the step of controlling includes changing at least one process parameter of the additive manufacturing process.

9. The method of claim 1 further comprising using a process sensor to trigger operation of the imaging apparatus.

10. The method of claim 1 wherein:
    the steps of depositing and curing are repeated for plurality of layers; and
    the steps of producing the image and evaluating the image are repeated at a selected interval of one or more layers.

11. A method for producing a component layer-by-layer, comprising:
    depositing resin which is radiant-energy-curable on a build surface located in a build zone of a resin support;
    positioning a stage relative to the build surface so as to define a layer increment in the resin on the build surface;
    selectively curing the resin on the build surface using an application of radiant energy in a specific pattern so as to define the geometry of a cross-sectional layer of the component;
    moving the build surface and the stage relatively apart so as to separate the component from the build surface, wherein uncured resin remaining on the build surface defines a negative structure of the layer being cured, the negative structure including at least one void; and
    using an imaging apparatus to produce an image of the negative structure.

12. The method of claim 11 wherein the step of using the imaging apparatus includes:
    using the resin support to move the remaining resin out of the build zone;
    using the resin support to move the remaining resin into the field-of-view of the imaging apparatus; and
    using the imaging apparatus to produce the image of the negative structure.

13. The method of claim 11 further comprising pitting the steps of depositing, positioning, selectively curing, separating, for a plurality of layers, until the component is complete, wherein the steps of producing the image and evaluating the image are repeated at a selected interval of one or more layers.

14. The method of claim 11 further comprising using an imaging apparatus to produce an image of the resin on the build surface prior to the step of curing.

15. The method of claim 11 wherein the step of evaluating the negative structure further includes identifying the presence of cured resin remnants within voids of the negative structure.

16. The method of claim 11 further comprising using a process sensor to trigger operation of the imaging apparatus.

17. The method of claim 11 wherein the imaging apparatus is a digital camera.

18. The method of claim 11 further comprising:
    evaluating the image of the negative structure; and
    controlling at least one aspect of the additive manufacturing process with reference to the image of the negative structure.

19. The method of claim 18 wherein the evaluation of the image includes performing feature detection on the image.

20. The method of claim 18 wherein the evaluation of the image includes performing metrology on the image.

21. The method of claim 18 wherein the step of controlling includes taking a discrete action in response to the evaluation of the image indicating an unacceptable result.

22. The method of claim 21 wherein the discrete action includes pausing or stopping the build process in response to the evaluation of the image indicating an acceptable result.

23. The method of claim 21 wherein the discrete action includes stopping the build process of one feature of the component in response to the evaluation of the image indicating an unacceptable result.

24. The method of claim 21 wherein the discrete action includes reprinting all or a portion of a layer in response to the evaluation of the image indicating an unacceptable result.

25. The method of claim 21 wherein the step of controlling includes changing at least one process parameter of the additive manufacturing process.

26. The method of claim 11 wherein the resin includes a particulate material filler.

27. The method of claim 11 further comprising sintering the component to burn out the cured resin and consolidate the filler.

28. The method of claim 27 further comprising infiltrating a lower-melting-temperature material into the component during or after sintering.

29. The method of claim 11 wherein the application of radiant energy is applied by projecting a patterned image comprising a plurality of pixels.

30. The method of claim 29 wherein the patterned image is shifted during the application of radiant energy.

31. The method of claim 29 wherein additional radiant energy is applied by scanning at least one build beam over the surface of the resin.

32. The method of claim 11 wherein the radiant energy is applied by scanning a build beam over the surface of the resin.

33. The method of claim 11 wherein the two or more unique material combinations are deposited for a single layer of the component.

34. An additive manufacturing apparatus, comprising:
a resin handling assembly, the resin handling assembly including a resin support, wherein the resin support defines a build surface which is located in a build zone of the resin handling assembly;
a material depositor operable to deposit a resin which is radiant-energy-curable onto the build surface;
a stage positioned adjacent the build zone and configured to hold a stacked arrangement of one or more cured layers of a radiant-energy-curable resin; and
one or more actuators operable to manipulate a relative position of the build surface and the stage;
a radiant energy apparatus positioned adjacent to the build zone opposite to the stage, and operable to generate and project radiant energy in a predetermined pattern; and
an imaging apparatus operable to produce an image of a negative structure which is defined by uncured resin remaining on the build surface.

35. The apparatus of claim 34, wherein:
the imaging apparatus is positioned outside of the build zone; and
the resin support includes means for moving resin deposited thereon outside of the build zone and into a field-of-view of the imaging apparatus.

* * * * *